(No Model.)

J. C. COFFEE.
LEVER LIFTING JACK.

No. 554,579. Patented Feb. 11, 1896.

Witnesses.
Robert Everett
Thos. A. Green

Inventor:
John C. Coffee.
By James L. Norris.
Atty.

UNITED STATES PATENT OFFICE.

JOHN C. COFFEE, OF DECATUR, INDIANA, ASSIGNOR OF ONE-HALF TO WILLIAM L. COFFEE, OF SAME PLACE.

LEVER LIFTING-JACK.

SPECIFICATION forming part of Letters Patent No. 554,579, dated February 11, 1896.

Application filed June 14, 1895. Serial No. 552,811. (No model.)

*To all whom it may concern:*

Be it known that I, JOHN C. COFFEE, a citizen of the United States, residing at Decatur, in the county of Adams and State of Indiana, have invented new and useful Improvements in Lever Lifting-Jacks, of which the following is a specification.

This invention relates to lever lifting-jacks, and more especially to that class designed for raising vehicles, and has for its objects, first, to provide improved means for adjusting the fulcrum of the lifting-lever to accommodate the same for lifting either the front or rear axle of the vehicle; secondly, to provide improved means for holding the jack in its raised position; thirdly, to provide improved means for preventing injury to the axle of the vehicle raised by the jack; fourthly, to provide means for the convenient storage of a grease-box and means for rendering the same ready of access, and, lastly, to improve the construction generally of lifting-jacks of the type described.

To these ends my invention consists in the novel features and the construction, arrangement or combination of parts hereinafter described, and afterward pointed out in the claims following the description, due reference being had to the accompanying drawings, forming a part of this specification, wherein—

Figure 1:
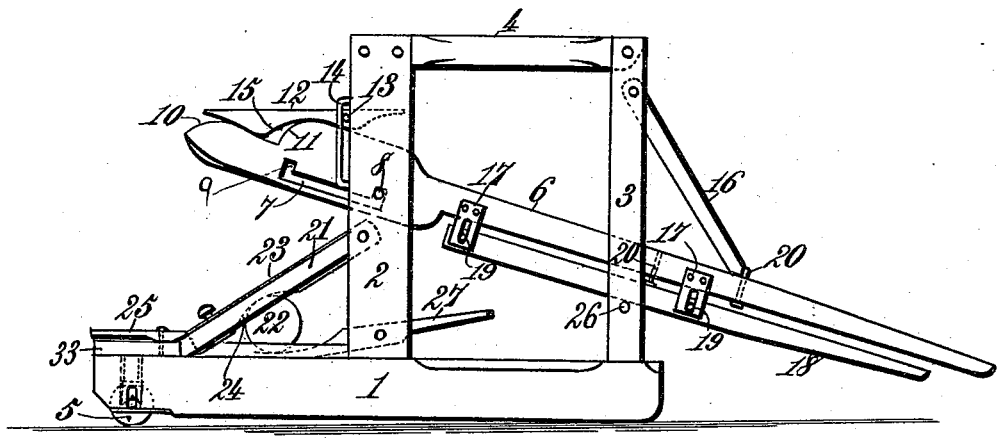
Figure 3:
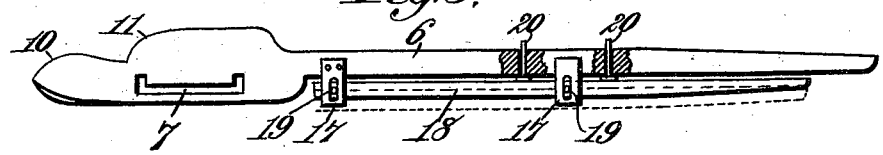
Figure 2:
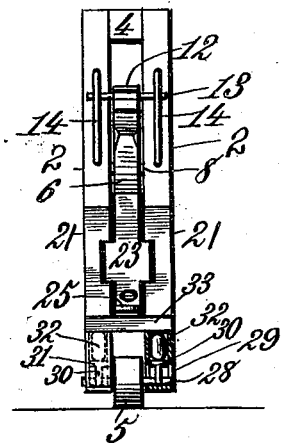

Figure 1 is a side elevation, Fig. 2 is an end elevation, and Fig. 3 is a sectional detail view, of the lever-holding apparatus.

In order that those skilled in the art may be able to make and use my invention I will describe the same in detail, reference being had to said drawings, in which the numeral 1 indicates the base or sill of the lifting-jack, to which are secured two pairs of parallel uprights 2 and 3, which at their upper ends are secured together by a brace-bar 4. In a suitable recess formed in the lower side of the forward end of the base or sill 1 of the jack is journaled a roller 5, for the purpose hereinafter described. Arranged between the uprights 2 and 3 is the lifting-lever 6, which is provided with a slot 7, through which passes a pin or bolt 8, which serves as a pivot upon which the lever 6 is fulcrumed. The opposite ends of the slot 7 are extended vertically upward, as at 9, to form bearings for the lever upon the pivot-pin 8 in either of its adjusted positions. The forward end of the lever 6 is provided with a curved extremity 10, in the immediate rear of which is a curved shoulder 11. Adapted to rest upon said end of the lever 6 is a shoe 12, said shoe at its rear end being provided with a pivot-pin 13, that is free to play vertically between guides 14 secured to the uprights 2. The lower side of the hinged shoe 12 is provided with a curved face 15, that is adapted to engage and rest upon either the curved end 10 of the lever or the curved shoulder 11 thereof. Between the rear uprights 3 is pivoted an arm or pawl 16, the free end of which is free to drop by gravity and operates to hold the lever in its raised position by the following means:

Secured to the opposite sides of the lever 6 are downwardly-depending slotted plates 17, between which is arranged a bar 18, pins 19 being secured to and projecting from the opposite sides of said bar and resting within said slotted plates. Resting upon the upper side of said bar are two upwardly-projecting pins 20, which are adapted to pass through perforations formed in the lever 6 and project above the upper edge thereof and are adapted to be engaged by the free end of the arm or pawl 16.

To the uprights 2 and to the forward end of the sill or base 1 are secured two diagonal bars 21, between which and the sill 1 is adapted to be seated and supported a grease-box 22. Between the upper rear ends of the bars 21 is pivoted a cover 23, which intermediate its ends and upon its under side is provided with a grooved recess 24, adapted to fit over and retain in place the grease-box, as shown. To the sill 1 is pivoted a turn-button 25, which is adapted to be turned over the free end of the cover 23 and lock the latter in place over the grease-box. Pivoted between the uprights 2 is a foot-lever 27, upon one end of which the grease-box is adapted to rest and by means of which the latter may be raised into convenient reach of the hand.

The roller 5, journaled in the forward end of the base or sill 1, is mounted on a shaft or spindle 28, the opposite ends of which are journaled in slotted bearings 29 formed in said base or sill, in which the shaft or spindle has a vertical movement. A circular aperture is formed in the base or sill 1 over each end of the spindle 28, and in said apertures are arranged bearings each consisting of a block 30 recessed upon its under side to fit over the end of the spindle 28 and provided upon its upper side with a head 31 to form a seat for the lower end of a spring 32, which is arranged in the aperture over said bearing. The springs are confined in place by a cover 33, which is bolted or screwed to the upper side of the base or sill. The springs permit the roller 5 to yield vertically, so that when the vehicle or other load is raised the roller yields and permits the base or sill 1 to rest firmly on the ground.

The operation of my improved lifting-jack is as follows: By catching hold of the lever 6 and slightly raising the rear end of the jack the latter will be supported upon the roller 5 and may be slipped beneath the axle of a vehicle without the necessity of the operator stooping. The shoe 12 rests upon the under side of the axle between the latter and the end of the lever 6 and operates to prevent the lever from scraping, scratching, or otherwise marring or defacing the axle. By raising the rear end of the lever 6 the front end thereof will be lowered to pass beneath the axle, the shoe 12 dropping by gravity and resting over the end of the said lever. After the jack has been placed in position in the manner described, with the hinged shoe bearing against the under side of the axle, the vehicle is raised by depressing the rear end of the lever, the forward end thereof working against the recessed under side of the shoe and raising the latter in its bearings and with it the axle against which it bears. In wagons and other vehicles the rear axle is several inches higher than the front axle, and by shifting the fulcrum-point of the lever by the means described either the extreme end thereof or the curved shoulder 11 may be caused to engage the under side of the shoe 12 to raise the latter, the extreme end of the lever raising the shoe the proper height for elevating the front axle of a vehicle and the shoulder 11 raising said shoe several inches higher to raise the rear axle. When the rear end of the lever 6 is depressed to raise its load, the bar 18 comes in contact with a rod 26, secured to the uprights 3, and forces said bar against the under side of the lever 6, causing the pins 20 to project above the upper side of the lever. The pawl 16 will drop over in front of one of said pins and will lock the lever in place to hold the load elevated. To lower the load, the rear end of the lever is given a very slight downward movement to free the pawl from its engagement with the pin, when the latter will drop by gravity below the upper edge of the lever 6 and permit the forward end of the lever to drop. By placing the foot upon the end of the lever 27, the turn-button 25 being first swung from over the cover 23, the grease-box is elevated into convenient reach.

I have described my improved jack as being especially designed for elevating vehicles; but it will be readily understood that it is adapted for elevating loads of all kinds.

Having described my invention, what I claim is—

1. In a lever lifting-jack, the combination with a supporting-frame, of a lever fulcrumed thereon and longitudinally adjustable on said fulcrum, and a vertically-adjustable shoe pivotally connected to said supporting-frame and resting loosely on the lifting end of said lever, substantially as described.

2. In a lever lifting-jack, the combination with a supporting-frame, of a lever fulcrumed thereon and longitudinally adjustable on said fulcrum, said lever being provided at its lifting end with stepped bearings, and a vertically-adjustable shoe pivotally connected to said supporting-frame and resting loosely on the lifting end of said lever, said shoe being recessed upon its under side to engage either of the stepped bearings of the longitudinally-adjustable lever, substantially as described.

3. In a lever lifting-jack, the combination of a supporting-frame, of a lever 6 adjustably fulcrumed thereon provided at its lifting end with stepped bearings 10 and 11, vertical, elongated guides 14 secured to said supporting-frame, and a shoe 12 pivotally secured in said guides and vertically adjustable therein, said shoe resting loosely on the lifting end of said lever and having its under side recessed to engage either of the said stepped bearings, substantially as described.

4. In a lever lifting-jack, the combination with a supporting-frame, of a lever adjustably fulcrumed thereon, pins 17 and 20 loosely arranged in apertures in said lever, a bar 18 loosely suspended beneath the lever, a pawl 16 pivotally connected to said frame, and an abutment adapted to be engaged by the bar 18 when the rear end of the lever is depressed and cause said bar to project the said pins through the lever in position to be engaged by the free end of the pawl, substantially as described.

5. In a lever lifting-jack, the combination with a supporting-frame having a sill 1, of two diagonal bars 21, a hinged cover 23 pivoted between said bars, and a lever 27 pivoted to said sill and projecting at one end beneath said diagonal bars, substantially as described.

In testimony whereof I have hereunto set my hand in presence of two subscribing witnesses.

JOHN C. COFFEE.

Witnesses:
HENRY KRAUZ,
WILLIAM WINTERS.